(12) United States Patent
Handleman

(10) Patent No.: US 6,339,538 B1
(45) Date of Patent: *Jan. 15, 2002

(54) INVERTER CIRCUIT AND METHOD OF OPERATION

(76) Inventor: Clayton Kling Philips Handleman, 1083 Main St., Hingham, MA (US) 02043-3961

( * ) Notice: Subject to any disclaimer, the term of this patent is extended or adjusted under 35 U.S.C. 154(b) by 0 days.

This patent is subject to a terminal disclaimer.

(21) Appl. No.: 09/650,119

(22) Filed: Aug. 28, 2000

Related U.S. Application Data

(63) Continuation of application No. 09/337,620, filed on Jun. 21, 1999, now Pat. No. 6,111,767.
(60) Provisional application No. 60/090,257, filed on Jun. 22, 1998.

(51) Int. Cl.[7] ................................................ H02M 3/24
(52) U.S. Cl. .............................. 363/95; 363/98; 136/293
(58) Field of Search ............................... 363/95, 98, 55, 363/97; 136/293

(56) References Cited

U.S. PATENT DOCUMENTS

| 4,375,662 A | * | 3/1983 | Baker ........................... 363/95 |
| 4,580,090 A | * | 4/1986 | Bailey et al. ................ 323/302 |
| 4,873,480 A | * | 10/1989 | Lafferty ....................... 323/229 |
| 4,999,560 A | * | 3/1991 | Morishima et al. ......... 323/906 |

* cited by examiner

*Primary Examiner*—Shawn Riley
(74) *Attorney, Agent, or Firm*—Daly, Crowley & Mofford, LLP

(57) ABSTRACT

An inverter includes a first switch to disconnect an output of the inverter from any device connected thereto; a second switch to disconnect and connect an input of the inverter from direct current fed to the inverter; a discharge device to discharge any residual charge on a large capacitor; a voltage sensor to measure input DC voltage to the inverter; a current sensor to measure input DC current to the inverter; and a data recorder to provide a current voltage trace to provide a current-voltage curve tracer to provide current-voltage curve data that may then be used to calibrate a maximum power point tracker or alternatively sense array shading.

17 Claims, 10 Drawing Sheets

$I_{sc}$ = ARRAY SHORT CIRCUIT CURRENT
$V_{oc}$ = ARRAY OPEN CIRCUIT VOLTAGE

INVERTER CIRCUIT AND METHOD OF OPERATION

CROSS-REFERENCE TO RELATED APPLICATION

This application is a continuation of 09/337,620 filed Jun. 21, 1999 now U.S. Pat. No. 6,111,767 which claims priority under 35 U.S.C. § 119(e) from U.S. provisional application No. 60/090,257 filed on Jun. 22, 1998.

BACKGROUND OF THE INVENTION

This invention relates to photovoltaic (PV) power systems which utilize an inverter to convert the direct current (DC) output of PV arrays to alternating current (AC) and more particularly to improved methods and apparatus for measuring important system performance characteristics.

As it known in the art, PV refers to the conversion of incident solar radiation (insolation) to electricity. A PV cell (also known as a solar cell) can be provided from a large-area semiconductor pn junction diode with the junction positioned very close to the top surface. Since the output of an individual cell is relatively low, several PV cells are typically combined to form a PV module. In turn, multiple PV modules can be coupled to form PV panels and in turn again multiple PV modules can be coupled to form a PV array.

As it also known, a photovoltaic array exposed to solar radiation is capable of generating electrical power for a variety of purposes. One such purpose includes generating electrical power for a utility grid. PV arrays produce a DC voltage that is collected and combined and inversion is required for supplying AC loads or for utility-interactive operation. To thus convert the DC output voltage of the PV array to an AC voltage or current, a power inverter is used.

To interface the output of the PV array to a utility grid, a DC to AC inverter is needed to change the direct current voltage output of the PV array into, typically, a 60 Hz sinusoidal AC current waveform which feeds power to the utility grid.

The utility grid is a voltage source and as such power going into the grid can be changed by changing the magnitude of the current feeding the grid. Therefore, by changing the output current one can change the output power of the inverter within the constraints of the PV array feeding it.

For a condition of constant temperature and constant insolation there are an infinite number of voltage current pairs at which the PV array can operate. There is, however, one unique pair that produces maximum power from the PV array. This is called the Maximum Power Point (MPP). In an inverter connected to a power grid, it is desirable to operate at the MPP. A maximum power point tracker (MPPT) is used to ensure the system is operating at its MPP. The operating points are selected by changing the PV array load impedance. In the case where an inverter is connected to the PV array, the inverter is the load and its input impedance can be altered under microprocessor control. Modern inverters are quite good at locating the maximum power point for a given set of operating conditions. This is one of the characteristics that are utilized in the present invention.

Use of PV arrays connected to utility grid applications is becoming more common. It is not, however, a cost effective power generation source. There is, however, a trend of rapidly dropping prices for increased production volume for PV arrays. Due to rising concern over the greenhouse effect, it is desirable to reduce electricity generation through combustion. Photovoltaic arrays are a clean energy source that can displace combustion and reduce greenhouse emissions. For this reason, it is desirable to accelerate the introduction of PV arrays. This can be done through increased demand. One way to increase demand is by increasing the value of a PV system beyond just the raw power that is produced.

One growing market for PV systems are in school mounted systems. Typically these systems incorporate a rudimentary Data Acquisition System (DAS) that sends data into a school classroom. These DASs can increase the cost of a system by as much as 20%. Usually the price is paid because the data can be used in the classrooms to teach science. Usually the students are very motivated when using this type of laboratory tool. Thus, the capability added by a DAS adds considerable value to the PV system which enhances the usefulness of the PV system as a teaching tool.

Conventional data acquisition systems, however, have several drawbacks. As mentioned above they are relatively expensive. Also data acquisition systems typically do not provide the capability to monitor harmonic distortion and perform PV array I–V curve traces.

It would, therefore, be desirable to provide an inverter system which provides substantially the same functionality provided by conventional DAS supplemented inverter systems at a reduced cost and with the added functionality of monitoring harmonic distortion and acquiring I–V curve traces.

SUMMARY OF THE INVENTION

The present invention reduces the cost of PV system data acquisition capability by a factor of from 5 to 10 while dramatically increasing functionality. In particular it adds the capability to monitor harmonic distortion and perform PV array I–V curve traces. Further it can eliminate the need for a relatively costly insolation transducer. The present invention reduces cost by utilizing circuitry that already exists in the inverter. It had not heretofore been recognized that there exists a multitude of redundancy between components in the inverter and in the external DAS and that by modifying an inverter, capability beyond that of an industry standard DAS could be included for substantially lower cost. Thus, as will be described herein below, an inverter modified in accordance with the present invention provides capability beyond that of an industry standard DAS at a relatively low cost.

In accordance with the present invention, a method for measuring parameters of a photovoltaic (PV) power system includes the steps of operating an inverter for converting direct current (DC) to alternating current (AC) including the steps of measuring input DC voltage to the inverter; measuring input DC current to the inverter; measuring output AC voltage from the inverter; measuring output AC current; calculating, from the input DC voltage, the input DC current, the output AC voltage and the output AC current; maximum power point of the inverter; calculating, from the input DC voltage and the input DC current, solar insolation; and calculating, from the maximum power point and the solar insolation, temperature of a solar cell. With such an arrangement, an inverter is provided with an integrated low cost data acquisition system (DAS).

In accordance with another aspect of the present invention, a method for measuring parameters of a photovoltaic power system includes the step of operating an inverter for converting direct current (DC) to alternating current (AC) including the steps of disconnecting an output of the inverter from any device connected thereto; disconnecting an input of the direct current fed to the inverter; discharging any residual charge on a large fully discharged capacitor; connecting the input of the direct current across a large fully discharged capacitor; measuring input DC voltage to the inverter; measuring input DC current to the inverter; and providing current voltage data to provide a current-voltage curve tracer. With such an arrangement, an inverter is provided, when off line with a power grid, having a capability to gather information of current voltage curve tracing which can then be used to provide other information.

In accordance with another aspect of the present invention, an inverter includes a first switch to disconnect an output of the inverter from any device connected thereto; a second switch to disconnect and connect an input of the inverter from direct current fed to the inverter; a discharge device to discharge any residual charge on a large capacitor; a voltage sensor to measure input DC voltage to the inverter; a current sensor to measure input DC current to the inverter; and a data recorder to provide a current voltage trace to provide a current-voltage curve tracer. With such an arrangement, a current-voltage curve tracer is provided to provide current-voltage curve data that may then be used to calibrate a maximum power point tracker or alternatively sense array shading.

BRIEF DESCRIPTION OF THE DRAWINGS

For a more complete understanding of this invention, reference is now made to the following description of the accompanying drawings, wherein.

DESCRIPTION OF THE PREFERRED EMBODIMENTS

The invention described below shows how, with minor, low cost, modifications, a state of the art inverter can perform the data acquisition tasks typically performed by a costly external DAS. Furthermore, Total Harmonic Distortion (THD) and I–V curve trace capability can be added at very little additional cost. Also a technique for measurement of insolation without use of external transducers will be presented which further reduces data acquisition costs.

Figure 1:
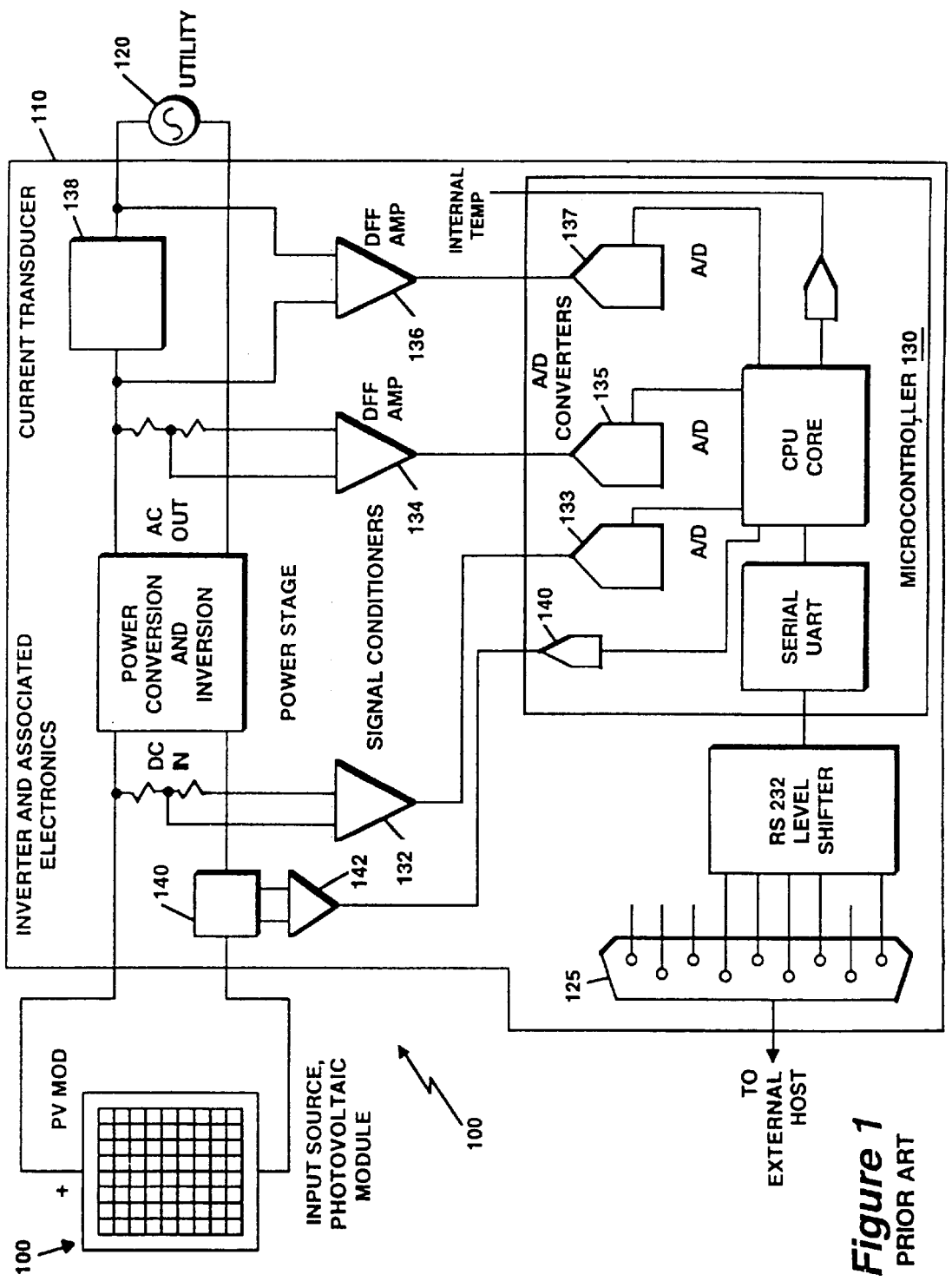
FIGS. 1 and 1A are block diagrams of a prior art inverter.
Figure 1A:
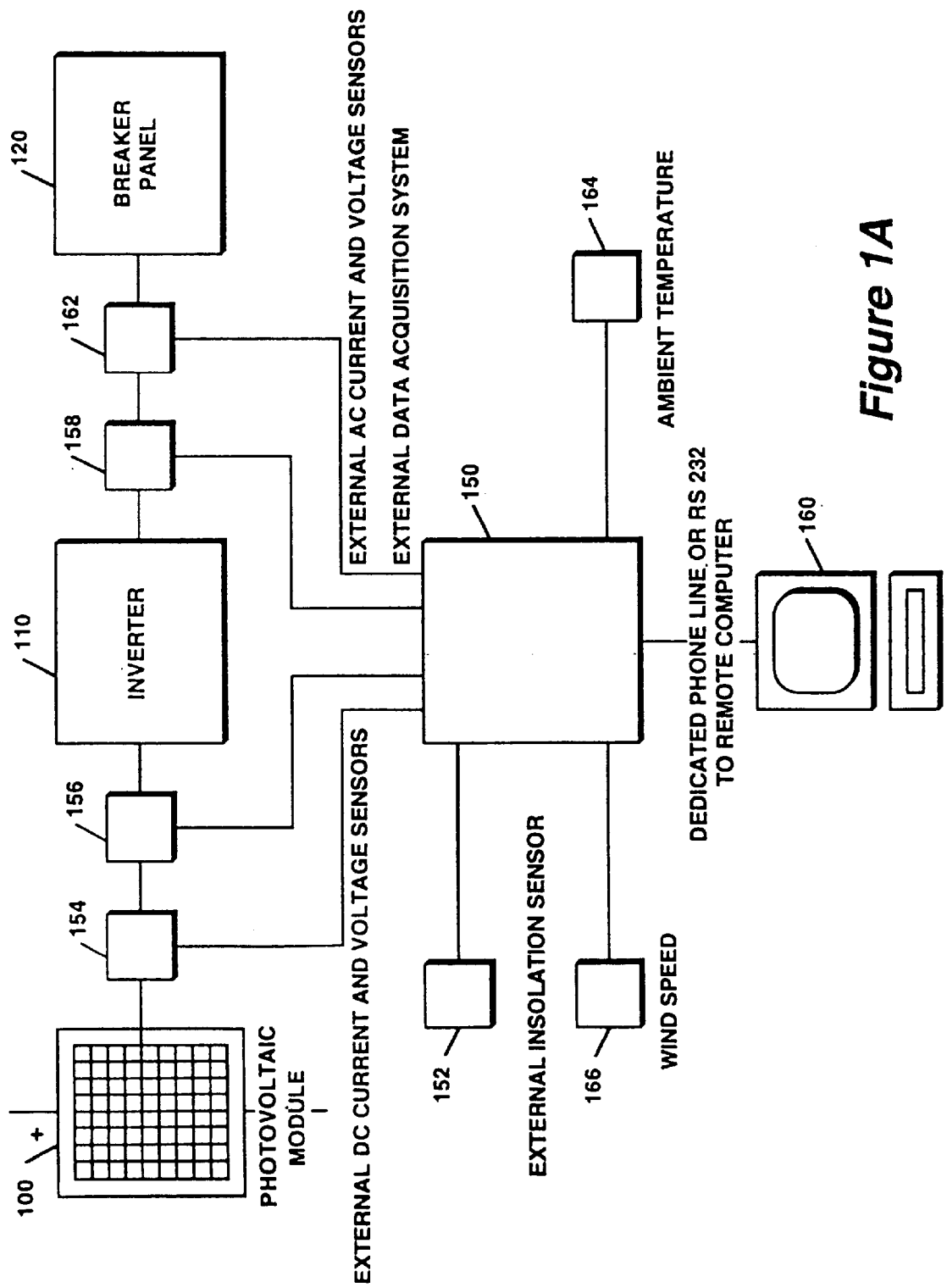

Before embarking on a detailed description of the invention, it may be helpful to review how a grid connected photovoltaic (PV) power system operates. Referring now to FIGS. 1 and 1A, a photovoltaic array 100 produces a DC voltage that is collected and combined and then converted to an AC current by a power inverter 110. For stable operation and in order to operate in compliance with applicable codes (Underwriters Laboratories, National Electric Code, IEEE 929) the inverter must measure and/or detect a variety of internal parameters including: utility voltage zero crossing, internal inverter temperature, DC input voltage, AC output voltage and AC output current. These are all monitored by an on-board microcontroller. Utilizing these capabilities and making some low cost modifications, one can measure all parameters of interest to scientists, maintenance personnel, educators and interested laypersons thus eliminating the need for an external DAS.

Typically, a user is interested in the sun's plane-of-array insolation, inverter input power, inverter output power and derived quantities such as inverter efficiency, system efficiency, array efficiency, total harmonic distortion and total energy. Furthermore, it would be useful to measure the array's I–V characteristics. To date people haven't asked for that capability because it hasn't occurred to them that it could be done at low cost. This type of instrumentation currently costs around $18,000, more than a medium sized PV array. Increased inverter direct costs to add this capability will be under $100 for a 2 Kw inverter.

Some of the latest generation inverters provide some of this information, the most capable being the AES, Inc. GC-1000 which monitors AC voltage, current and power, DC voltage, current and power, cumulative output energy, run time and internal temperature. It does not measure THD, insolation, or IV curve trace. Nor can it utilize external temperature transducers such as module temperature sensors, ambient temperature sensors, anemometers and external insolation transducers. Today, these parameters cannot be deduced due to the limited capability provided by presently available on-board state-of-the-art inverter circuits.

Referring now to FIG. 1A, in the current industry standard technique, a Data Acquisition System (DAS) 150 is installed as a separate unit sometimes costing more than the inverter 110 itself. The DAS 150 is connected to external sensors 152, 154, 156, 158, 162, 164 and 166 to collect information regarding the photovoltaic system. That information can then be downloaded in a variety of ways including, RS232 to a local computer, modem over phone lines to a remote computer, or directly to a portable computer. Though flexible, this industry standard data logger is limited particularly when it comes to synchronization. This limits its usefulness in sampling to measure THD and in measuring the rms DC input voltage and current. The reason that an rms value is desirable is because there is some ripple induced on the input in normal operation of the inverter. The ripple is of sufficient magnitude that, for accurate measurement, the rms value rather than the average value should be used.

Today, inverters have to monitor input voltage and output current and output voltage in order to properly operate. For example, a differential amplifier 132 connected across the input of the inverter 110 can be used to measure the input voltage with the output of the differential amplifier 132 being fed to an A/D converter 133. The A/D converter 133 provides a digital signal indicative of the input voltage to a microcontroller 130. A differential amplifier 134 connected across the output of the inverter 110 can be used to measure the output voltage with the output of a differential amplifier 134 being fed to an A/D converter 135. The A/D converter 135 provides a digital signal indicative of the output voltage to the microcontroller 130. To measure the output current, a current transducer 138 is connected in line with the output of the inverter 110 as shown. A differential amplifier 136 is connected across the input and the output of the current transducer 138 as shown with the output of the differential amplifier 136 being fed to an A/D converter 137. The A/D converter 137 provides a digital signal indicative of the output current to the microcontroller 130. Some systems available today provide for external communication of these system parameters to a host computer 160 via a communication link 125 such as an RS 232 or an RS 485 connection. Though this is sufficient to monitor gross operation and provide some of the data necessary for O&M, it is insufficient to provide much of the data desired by educators or those interested in the overall economics of the system. With inexpensive modifications to the inverter 110, the inverter can acquire critical parameters of interest without external sensors. From these parameters additional parameters of interest can be derived. These parameters include array output power, solar insolation, inverter efficiency, system efficiency, array efficiency and harmonic distortion.

It has been recognized in accordance with the present invention that with relatively inexpensive modifications to an inverter's internal circuitry, a modified inverter can be used to monitor the same system parameters for which costly DASs are purchased. By adding an input current sensor to the inverter and appropriate data processing, these parameters can be measured or calculated using the internal microcontroller 230 (FIG. 2) in conjunction with a host computer 160. It should be appreciated, of course, that in some embodiments it may desirable or preferable to have the microcontroller 230 perform the processing. Using the knowledge that the inverter 110 keeps the array 100 operating at its maximum power point, under steady state insolation conditions, and a priori knowledge of the mathematical characteristics of the solar modules, solar insolation can be deduced without the use of external sensors. Furthermore, for customers who desire it, at relatively little expense, additional capability can be added to utilize a variety of external meteorological sensors. This completely eliminates the need for an external DAS, substantially reducing the total system cost.

Figure 2:
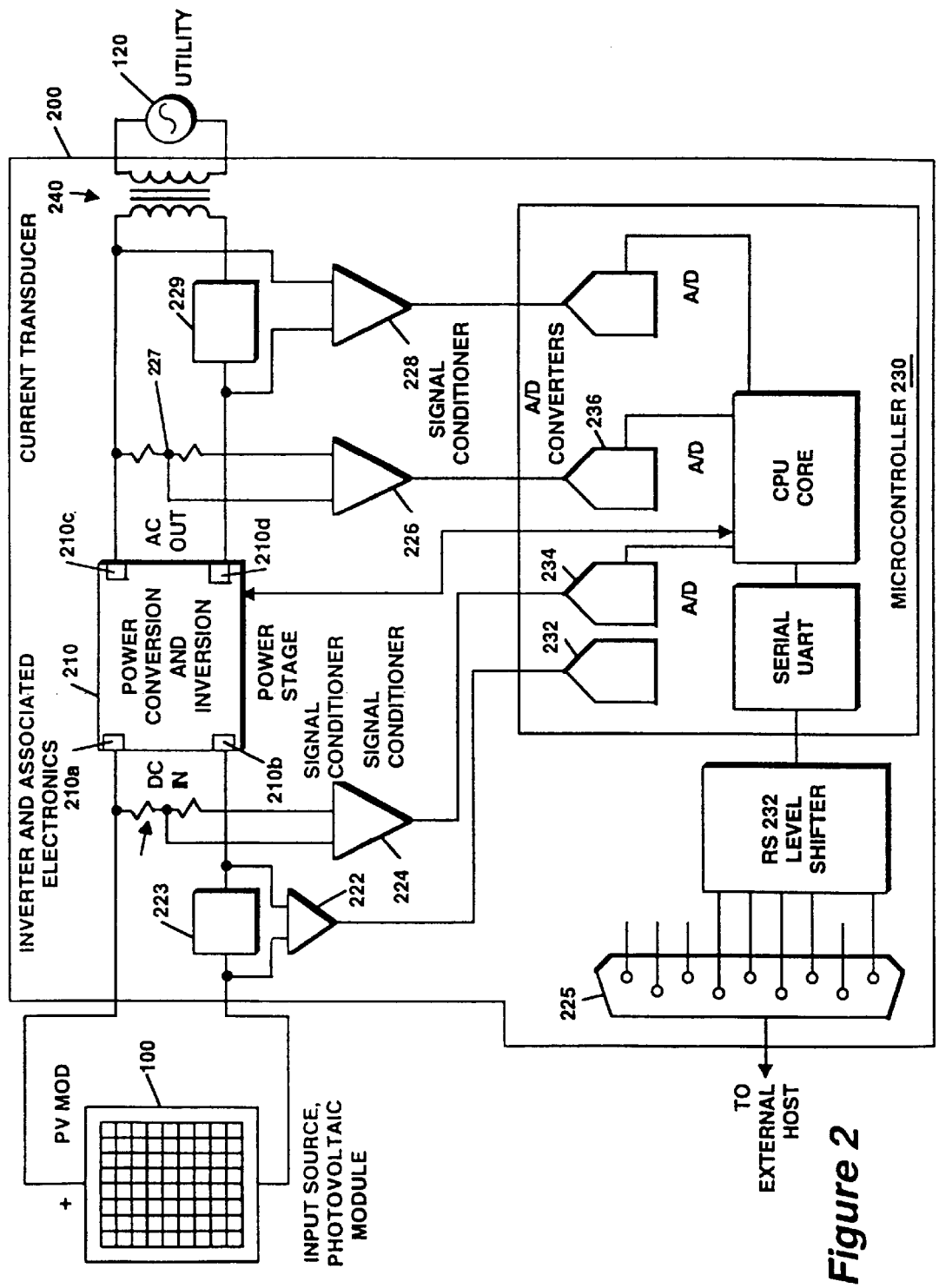
FIGS. 2 and 2A are block diagrams of an inverter according to the invention.
Figure 2A:
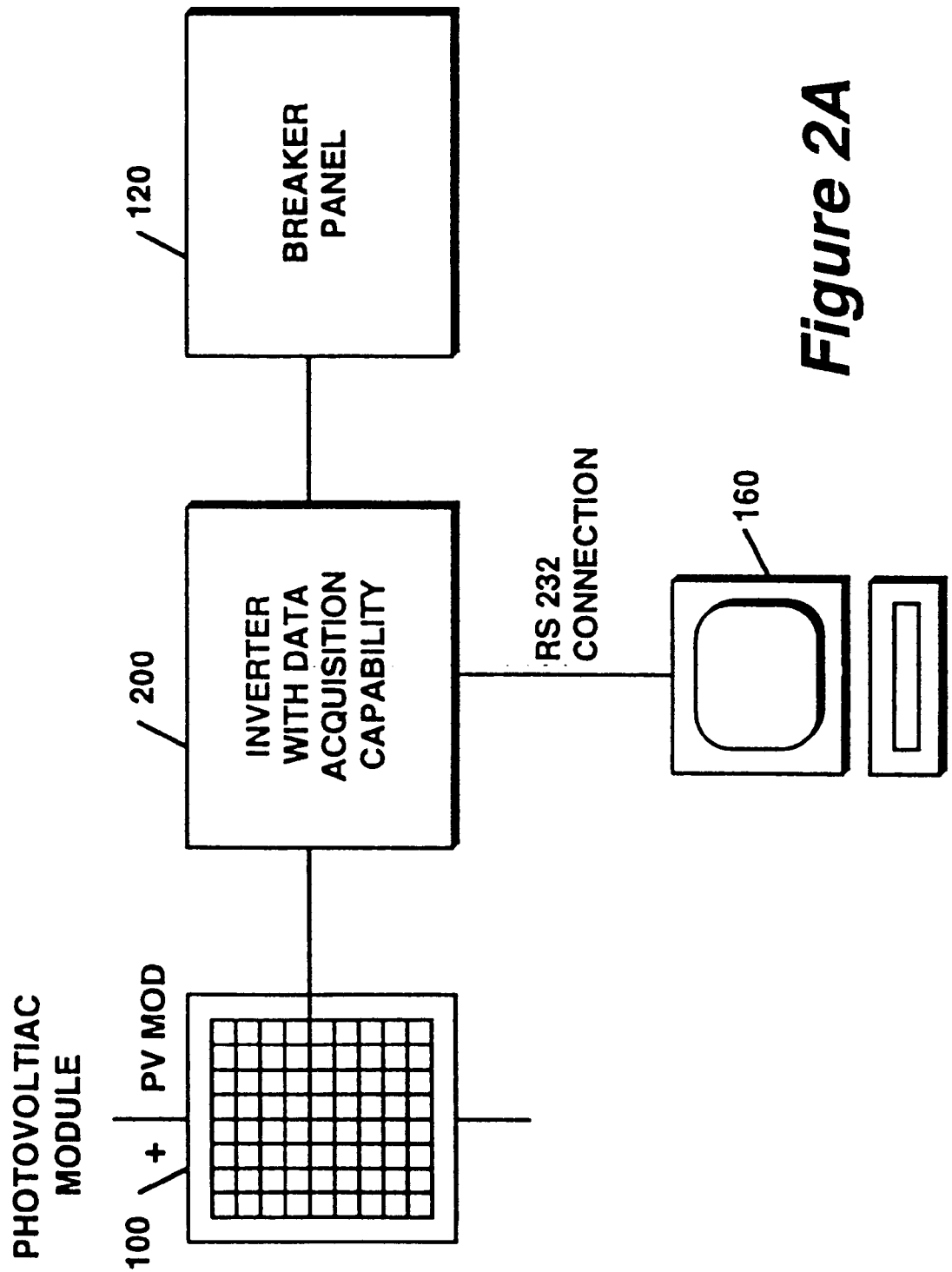

Referring now to FIGS. 2 and 2A, a preferred embodiment is shown of a utility grid-interactive sinewave inverter 200 (hereinafter referred to as inverter 200). The inverter 200 performs a variety of functions including conversion of the DC output of a photovoltaic array 100 to utility grid compatible AC current which is fed into the utility grid 120. The inverter 200 also performs verification of utility voltage and frequency, monitoring of output current to prevent overload and for control functions and monitoring of array voltage to ensure proper start-up conditions. Furthermore, the inverter 200 must find, and operate at, the photovoltaic array 100 optimal operating point. This operating point is referred to as the maximum power point (MPP). The inverter 200 includes a power conversion and inversion section 210 having an input 210a, 210b and an output 210c, 210d which converts a DC voltage provided at the input to an AC voltage at the output. A differential amplifier 224 connected across the low voltage resistor in a voltage divider 221 connected across the input 210a, 210b of the power conversion and inversion section 210 can be used to measure the DC input voltage. The output of the differential amplifier 224 is fed to an A/D converter 234. The A/D converter 234 provides a digital signal indicative of the input voltage to the microcontroller 230. To measure the input current, a current shunt 223 is connected in line with the input 210b of the power conversion and inversion section 210 as shown. A differential amplifier 222 is connected across the input and the output of the current shunt 223 as shown with the output of the differential amplifier 222 being fed to an A/D converter 232. The A/D converter 232 provides a digital signal indicative of the input current to the microcontroller 230. A voltage transducer such as a LEM LV25P is connected across the output 210c, 210d of the power conversion and inversion section 210 and is used to measure the output voltage with the output of the differential amplifier 226 being fed to an A/D converter 236. The A/D converter 236 provides a digital signal indicative of the output voltage to the microcontroller 230. To measure the output current, a current transducer such as a LEM LTS 25NP 229 is connected in line with the output 210d of the inverter 210 as shown. A differential amplifier 228 is connected across the input and the output of the current transducer 229 as shown with the output of the differential amplifier 228 being fed to an A/D converter 238. The A/D converter 238 provides a digital signal indicative of the output current to the microcontroller 230. The microcontroller 230 is programmed as described below to provide the requisite parameters. The microcontroller 230 includes the on-board analog to digital (A/D) converters 232, 234, 236, 238 allowing for tight integration of control functions. This method of measuring AC voltage and current is generally applicable to any inverter design.

Another method under consideration takes advantage of our specific inverter topology by sensing current on the inverter side of an isolation transformer. This eliminates some of the stringent isolation requirements that exist when sensing on the utility side of the transformer. In this design a buck converter is used to shape the sinewave and an H bridge is used to do the inversion. The current and voltage sense are done after the waveform has been shaped but before it is inverted by the H bridge. This allows a ground referenced sensor to be used. The measurements can then be done using a simple shunt and voltage divider as was described for the DC measurements above.

The array voltage which is the input voltage to the inverter 200 is monitored to determine when the array is sufficiently energized to enable proper operation of the inverter 200. When the input voltage is proper, then the inverter 200 goes into operational mode. The output voltage is monitored to confirm connection to the utility grid 120 and to confirm that there is no utility grid fault such as a power outage. Additionally, the output voltage is fed to a zero crossing detection circuit that is used to synchronize the output current so that both output current and output voltage are in phase. This is also used to monitor utility frequency in order to detect utility faults. The output current is used for emergency shutdown in the event of a severe overcurrent situation. The current measurement is also used in the inverter feedback and control circuitry. A communication link 225 provides external communication of system parameters to a host computer 160 via the communication link 225 such as an RS 232 or an RS 485 connection.

Figures 4A, 4B:
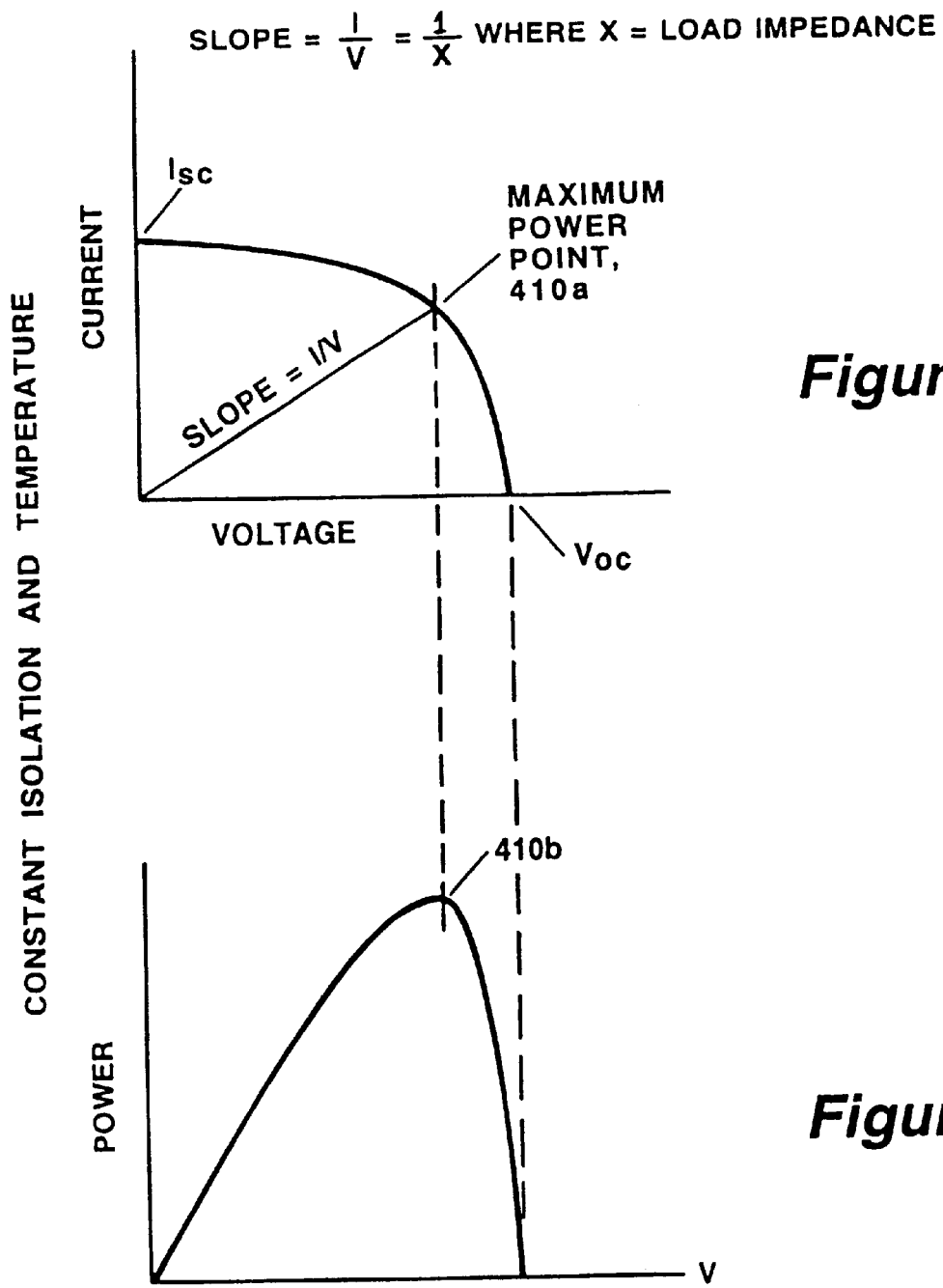
FIG. 4A is a graph showing current versus voltage for a typical photovoltaic solar system.
FIG. 4B is a graph showing power versus voltage for a typical photovoltaic solar system.

Referring momentarily to FIGS. 4A and 4B, it should be appreciated that at any given light level and array module temperature there are an infinite number of current-voltage (IV) pairs, or operating points, at which the module or array can operate. It should, however, be noted there exists a single MPP 410a. Notice that each point in FIG. 4a corresponds to a point in FIG. 4b. The global maximum on FIG. 4b represents the MPP. Also note that a line can be drawn from the origin to any point on the IV curve of FIG. 4a with slope IV. This is the reciprocal impedance of the load that the array operates into. Therefore it is clear that the operating point of the system is dependent upon the load impedance X. In an inverter based PV system, the load that the array 100 sees is the input impedance of the inverter 200. To control the input impedance, microcontroller 230 provides a control signal 212 to the power conversion and inversion section 210 to vary the input impedance. Typically a simple search algorithm is used to find the maximum power point (MPP) 410*a* and 410*b*. There are a variety of control algorithms that are used to vary the input impedance of the inverter 210 to find the MPP. Their implementation is called maximum power point tracking or MPPT and this is a well known technique in the art. Most state of the art inverters such as the Ascension Technology SunSine300 and the Omnion Series 2400 are very effective at finding and operating very close to the MPP.

Figure 3:
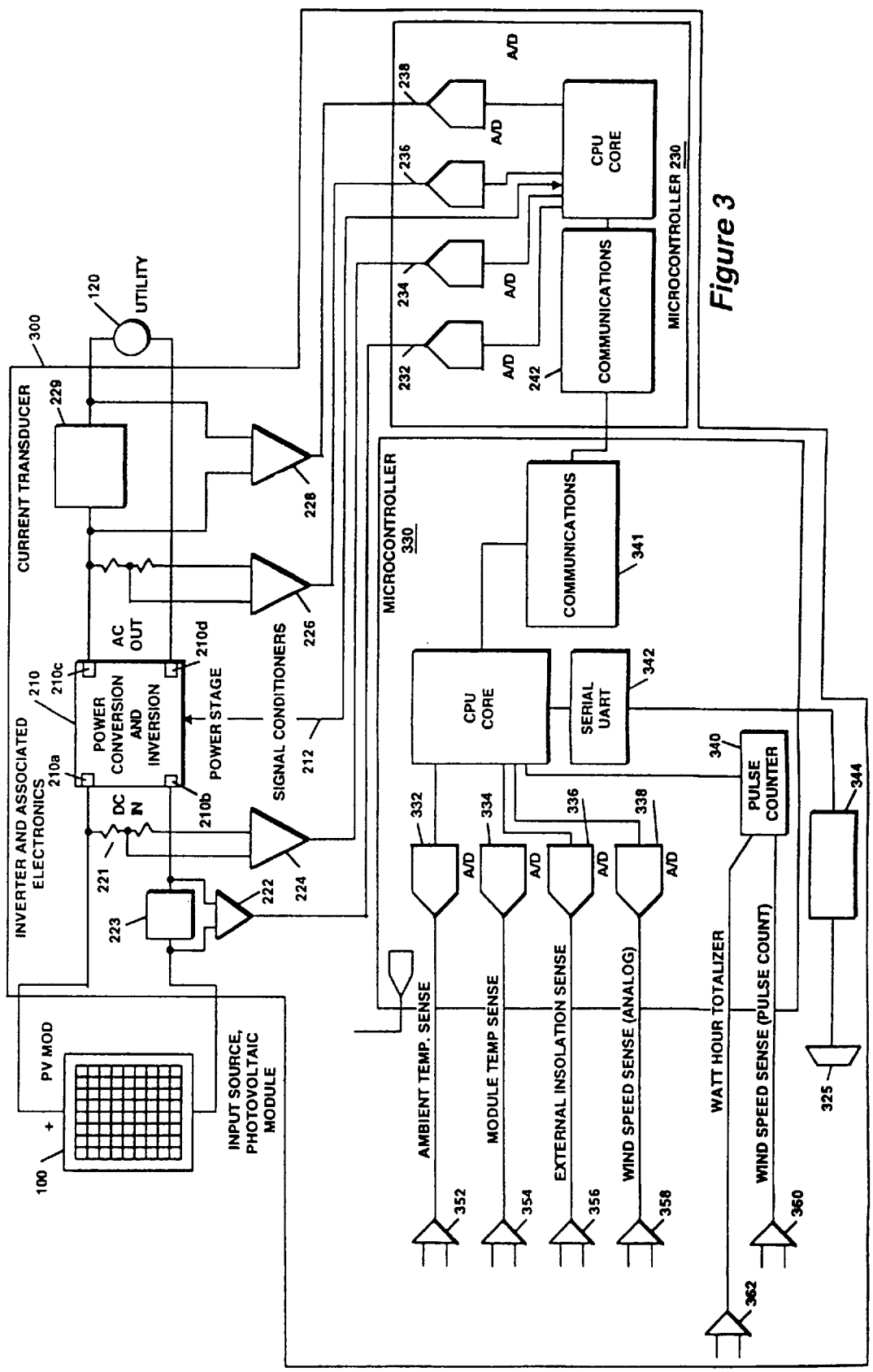
FIG. 3 is a block diagram of an alternative embodiment of an inverter according to the invention.

Referring now to FIG. 3, in a preferred embodiment, on-board sensing capability of an inverter 300 is shown augmented with other sensors to provide equivalent functionality of the full functionality of a DAS 150 (FIG. 1A) but at a substantially lower direct cost to the manufacturer. Preferred instrumentation can be divided into two groups: performance and meteorological. The performance measurements can be done without any external sensors. Such performance measurements provide the following data of interest: internal temperature, array current and voltage (inverter DC input current and voltage), and inverter AC output current and voltage. From this data, derived quantities of interest can be calculated including inverter (or module) efficiency, array efficiency, system efficiency, array power, system power, solar insolation and Total Harmonic Distortion (THD). Also, modifications to the unit permit the generation of sets of IV data pairs sufficient to generate IV characterizations such as shown in FIG. 4*a*. The system efficiency is a measure of how well the overall system converts sunlight to AC power. The inverter efficiency is a measure of how much energy is wasted in converting DC power to AC power. This data is useful for ascertaining the system's economics, obtaining useful operations and maintenance data, and for educational purposes. The invention takes advantage of the capability of the microcontroller to direct synchronous sampling and precisely timed sampling to develop data sets that can be used to develop sophisticated analysis capability previously only available with separate, expensive instrumentation. In particular, measurement of THD and acquisition of sets of IV points for fixed insolation and temperature. Furthermore this system can acquire insolation data without a relatively costly external pyranometer.

Taking advantage of the on-board microcontroller, power supply and communications capability, it is advantageous and inexpensive to add the capability to do meteorological sensing using external sensors in cases where the customer requests it. Additional external meteorological sensing devices allow for the measurement of module temperature, ambient temperature, insolation and wind speed. An external insolation transducer would be desirable in an inverter that did not perform MPPT well. In the case of an inverter that does MPPT well array temperature measurements provide for increased measurement accuracy of the solar radiation using the method described in the invention. Ambient temperature measurements and wind speed measurements provides information for the study of how wind speed affects module temperature. This information is useful in studying temperature dependent array performance.

The inverter 300 includes a power conversion and inversion section 210 having an input 210*a*, 210*b* and an output 210*c*, 210*d* which converts a DC voltage provided at the input to an AC voltage-at the output. Similar to the circuit described in FIG. 2, a differential amplifier 224 is connected to a voltage divider network 221 as shown across the input 210*a*, 210*b* of the power conversion and inversion section 210 and is used to measure the input voltage with the output of the differential amplifier 224 being fed to an A/D converter 234. The A/D converter 234 provides a digital signal indicative of the input voltage to the microcontroller 230. To measure the input current, a current shunt 223 is connected in line with the input 210*b* of the power conversion and inversion section 210 as shown. A differential amplifier 222 is connected across the input and the output of the current shunt 223 as shown with the output of the differential amplifier 222 being fed to an A/D converter 232. The A/D converter 232 provides a digital signal indicative of the input current to the microcontroller 230. The microcontroller 230 calculates the DC current from the known physical system parameters such as shunt resistance and gain of the differential amplifier. A differential amplifier 226 connected across the output 210*c*, 210*d* of the power conversion and inversion section 210 is used to measure the output voltage with the output of the differential amplifier 226 being fed to an A/D converter 236. The A/D converter 236 provides a digital signal indicative of the output voltage to the microcontroller 230. To measure the output current, a current transducer 229 is connected in line with the output 210*c* of the inverter 210 as shown. A differential amplifier 228 is connected across the input and the output of the current transducer 229 as shown with the output of the differential amplifier 228 being fed to an A/D converter 238. The A/D converter 238 provides a digital signal indicative of the output current to the microcontroller 230. The microcontroller 230 calculates the AC current from the known physical system parameters such as shunt resistance and gain of the differential amplifier. The microcontroller 230 is programmed as described below to provide the requisite parameters.

Here, communications is accomplished in the preferred embodiment by using a universal synchronous asynchronous receiver transmitter (USART) 242 on the microcontroller 230 as shown and routing its output through a USART 341 on microcontroller 330 as to be described.

It should be appreciated, input power can be obtained as the product of input voltage and current. Output power can be obtained as the product of peak output voltage aid current divided by 2. This peak can easily be found using the zero crossing capability combined with the sophisticated, highly accurate timing capability built into the microcontrollers used, for example, the Microchip PIC16C7X series.

Solar insolation calculations are made as follows. It has been observed that the maximum power point tracker in the inverter assures operation at the maximum power point on the IV curve of the PV array. Knowing this and measuring the array power, one can back solve for solar insolation using the following equation:

$$P_{\max} = \frac{P_{\text{maxs}} \dfrac{E}{E_s}}{[1 + G(T_s - T)]\left[1 + D\ln\left(\dfrac{E_s}{E}\right)\right]} \quad \text{Eq. (1)}$$

Where:
Es=1000 Watts/M$^2$, solar insolation at standard test conditions.
E=Solar insolation during measurement conditions.
D=Empirically derived constant specific to the PV module model. This would be factory determined and stored in a look-up table in microcontroller memory.
G =Empirically derived constant specific to the PV module model. This would be factory determined and stored in a look-up table in microcontroller memory.

$T_s$=Cell temperature at standard test conditions, 25° C.
$T$=Cell temperature during measurement conditions.
$P_{max}$=Maximum module output power during measurement conditions.
$P_{max\ s}$=Maximum module output power at standard test conditions.

The solar insolation can be deduced as follows. The MPP is a function of insolation and cell temperature. However, it is much more sensitive to insolation than temperature. So when the system is implemented without the capability to measure cell temperature, set G=0. Insolation can be deduced by waiting for the inverter MPPT algorithm to locate a stable operating point and then measuring the inverter input power and back solving Equation (1) for insolation.

In the preferred embodiment, the empirical constants D and G are measured at the factory and put into a look-up table in the computer. Now, a test methodology is easily implemented through the application of common engineering techniques. It should be appreciated that other algorithms could be implemented using other sets of equations in the literature.

In cases where the inverter 300 is located outdoors, its internal temperature can be used to deduce ambient temperature. This can be done using empirical testing and standard curve fitting techniques. This temperature can then be used to approximate module cell temperature with sufficient accuracy to significantly improve the estimate of insolation. An alternate technique is to generate a 3 dimensional look-up table using an array of possible temperatures, insolations and MPPs. Then two of the three quantities are measured and the lookup table is used to find the third. In addition, an option for connection of external sensors to the inverter 300 is provided. A temperature transducer, such as a resistance temperature detector (RTD), (not shown) to measure ambient temperature can be used and connected to differential amplifier 352. An output of differential amplifier 352 is connected to an input of an A/D converter 332. The A/D converter 332 provides a digital signal indicative of the ambient temperature to a microcontroller 330. A temperature transducer, such as an RTD, (not shown) to measure module temperature can be used and connected to differential amplifier 354. An output of differential amplifier 354 is connected to an input of an A/D converter 334. The A/D converter 334 provides a digital signal indicative of the module temperature to the microcontroller 330. An insolation sensor, such as an industry standard LiCore, pyranometer (not shown) to measure insolation can be used and connected to differential amplifier 356. This device produces a current proportional to insolation. A precision resistor is placed across the input of the differential amplifier 356 to convert the current to a voltage. An output of differential amplifier 356 is connected to an input of an A/D converter 336. The A/D converter 336 provides a digital signal indicative of insolation to the microcontroller 330. An analog output anemometer (not shown), to measure wind speed, can be used and connected to differential amplifier 358. An output of differential amplifier 358 is connected to an input of an A/D converter 338. The A/D converter 338 provides a digital signal indicative of wind speed to the microcontroller 330. Alternatively, a pulse anemometer (not shown) can be used to measure wind speed and is connected to an input signal conditioner, 360, this is typically a comparator used set up to optimally handle the output pulses of the anemometer which can be a sinewave or simple squarewave with frequency proportional to windspeed. The output of the signal conditioner, 360, is connected to the microcontroller's internal counter timer circuit 340. This circuit produces a digital signal indicative of frequency. A pulse watt-hour meter (not shown) can also be used to measure watt-hours and is connected to a comparator 362, the output thereof connected to the microcontroller's internal counter timer circuit 340. The counter timer 340 provides a digital signal indicative of the number of pulses to the microcontroller 330. This is typically stored in non-volatile memory to provide a running record of total energy produced by the PV array. With the ability to precisely monitor cell temperature, ambient temperature and wind speed, the latter parameters can be used to monitor system performance and would be of particular interest for advanced studies of PV systems.

In the preferred embodiment an 8 or 16-bit microcontroller is used which has sufficient resources to handle the measurement of the input and output electrical parameters, AC and DC current and AC and DC voltage. However, when external measurements, such as wind speed, are added, the capacity of the single microcontroller 230 may be taxed and a second microcontroller 330 can be added to handle all data acquisition tasks not required for operation of the inverter. This is a minimal increase in cost and has the advantage of keeping the programming complexity in the controller running the inverter to a minimum. This increases reliability and segments the programming task reducing engineering overhead.

Communications between the microcontroller 330 and a host controller 160 is accomplished, in the preferred embodiment, by using a universal synchronous asynchronous receiver transmitter (USART) 342 on the microcontroller 330 as shown and routing its output through a level shifter 344 to a standard RS-232 output connector 325. An optional implementation is to include optoisolators (not shown) to protect the inverter from external voltage surges. The RS-232 output connector is connected to a host computer 160 either by custom wiring or using an industry standard RS 232 cable (FIG. 2A). The choice is dependent upon proximity. Communication between microcontroller 330 and microcontroller 230 is accomplished using the synchronous serial port (SSP) included in the microcontrollers.

It should now be appreciated, a technique has been described for measuring parameters of a photovoltaic power system including the step of operating an inverter for converting direct current (DC) to alternating current (AC) having the steps of measuring input DC voltage to the inverter, measuring input DC current to the inverter, measuring output AC voltage from the inverter, and measuring output AC current and sensing the utility zero crossings. With such a technique, from the input DC voltage and the input DC current, input power to the inverter can be calculated and from the input power to the inverter, solar insolation, E, can be calculated using the equation (1) as described above. Further, accuracy of the calculation can be improved by measuring cell temperature and including it in the equation.

Total Harmonic Distortion (THD) in any of the electrical parameters can be obtained by sampling and then performing an FFT on the data. The data set is obtained by sampling multiple points at a rate twice the frequency of the highest harmonic of interest. These points are then downloaded to the host computer via the communications channel. An FFT routine is then used to separate out the frequency components of the waveform and calculate THD. In the preferred embodiment, this is done using a commercially available software package, Component Works, by National Instruments, Inc. It includes a built in signal processing package that can do FFTs on provided data.

Figure 5:
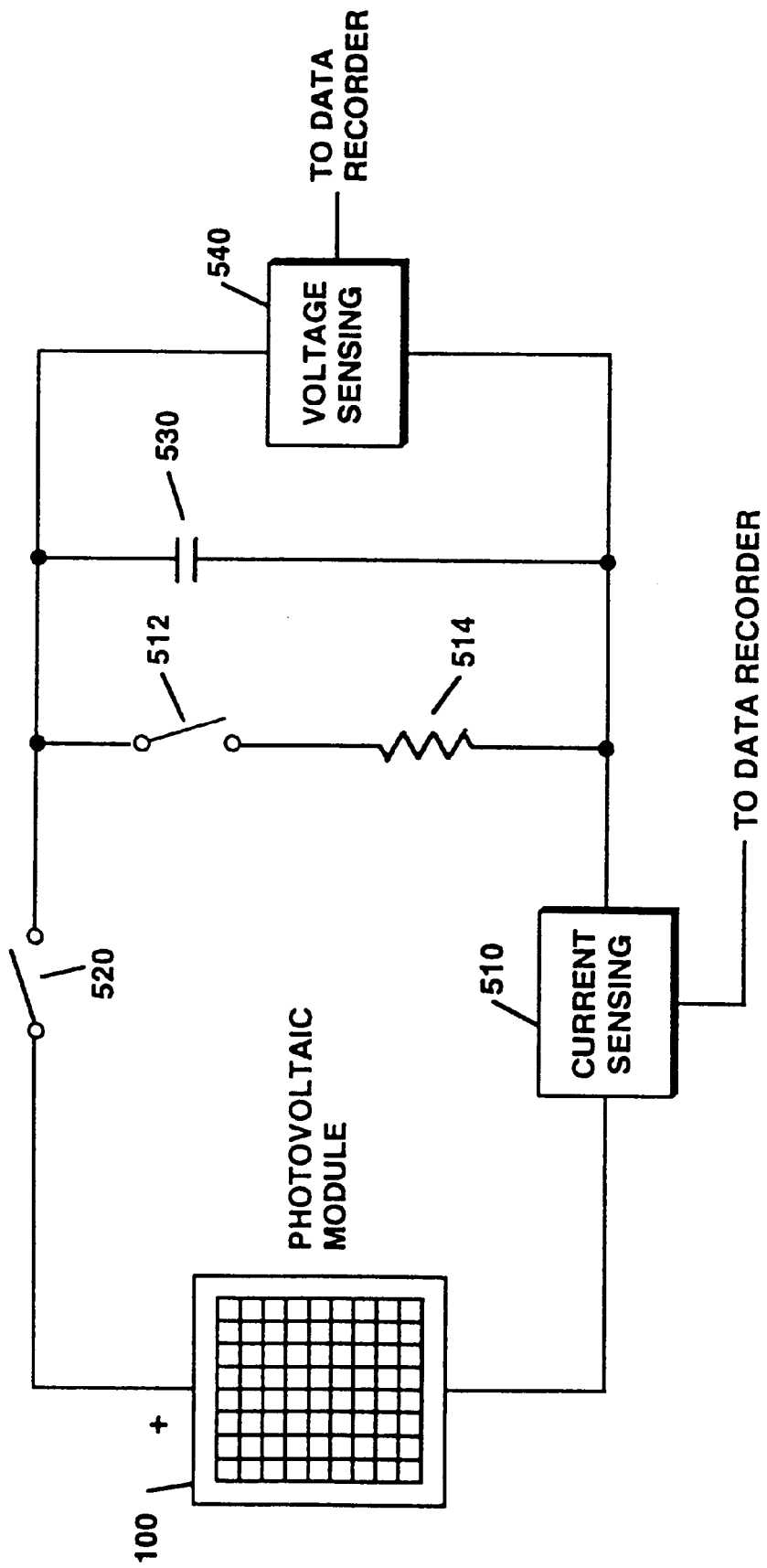
FIG. 5 is a diagram showing an implementation of current-voltage curve tracer according to the invention.

Referring now to FIG. 5, an inverter integrated current-voltage (IV) curve tracer for assessment or study of a captive photovoltaic array is shown. An inverter, used to convert the direct current (DC) output of a photovoltaic (PV) array to alternating current (AC), can be modified, at low cost, to probe the family of operating points of the solar array or module to which it is attached. Inverters have large energy storage capacitors on the input to minimize current ripple in the PV array. A current-voltage (IV) curve tracer function can be accomplished by adding a DC current sensor 510 and a controllable switch 520 to the inverter input and a switch 680 (FIG. 6) to its output. By closing the input switch 520 into a large fully discharged capacitors 530, nearly the entire 1st quadrant IV curve will be traversed in charging the capacitors 530. Further, because the capacitance on the inverter input is large and the PV array is current limited, the traversal of the IV curve will be sufficiently slow as to be easily acquired with relatively slow analog to digital (A/D) converters typically integrated into 8-bit microcontrollers. This will enable excellent characterization of the PV array.

A useful data set for education and Operations and Maintenance (O&M) is the set of current and voltage pairs associated with a given insolation level, such as shown in FIG. 4. This set of points is called a current voltage trace or IV curve. The device used to acquire the IV curve is called an IV curve tracer. Currently, the cost of acquiring this data outweighs its usefulness in the majority of cases. As a result, this method of photovoltaic array assessment is primarily used in research. Occasionally costly portable testers are brought to installations to assess systems for O&M requirements. It has been recognized that most of the circuitry needed to build an IV curve tracer is contained in presently manufactured inverters used to convert the DC output of the arrays to AC. Low cost modifications to existing circuitry rendering it capable of performing PV array IV curve tracing constitute the invention.

A curve tracer for characterizing a PV module or array can be built as shown in FIG. 5. The switch 520 is opened and the switch 512 is closed and all capacitor charge bleeds off from the capacitor 530 through the switch 512 and the resistor 514. It should be noted that any workable method for bleeding the capacitors is acceptable. It should be noted that resistor 514 should be chosen to ensure it is not so large that it would take too long to bleed the capacitor and is many instances, not needed. When the capacitor 530 is discharged, the switch 512 is opened and the switch 520 is closed. Immediately upon closure of switch 520 samples of voltage and current are taken and stored. Initially the voltage is zero so the module or array short circuit current (Isc) flows into the capacitor 530. As the capacitor 530 charges its voltage increases and the module current drops off in accordance with its IV characteristics. The capacitor 530 will charge to a voltage very close to the module open circuit voltage Voc. A variety of data recorder types can be used to record the IV curve. Here, a voltage sensing device 540 is used to measure the voltage across the capacitor 530 and a current sensing device 510 is uses to measure the current flowing into the capacitor 530. By sampling the current and voltage as the capacitor 530 charges, an IV curve such as the curve shown in FIG. 4 can be measured. Most sinewave inverters made today have nearly all the components required to implement an IV curve tracer of this type. This capability can be added for minimal costs. In order to add IV curve tracer functionality to an existing inverter design, one needs to add an input switch. In inverters that don't have a double pole output switch or DC current measuring capability, a Current sensor and a controllable double pole output switch must also be added. This hardware is relatively inexpensive and on a percentage basis adds minimal additional costs to an existing inverter design.

Figure 6:
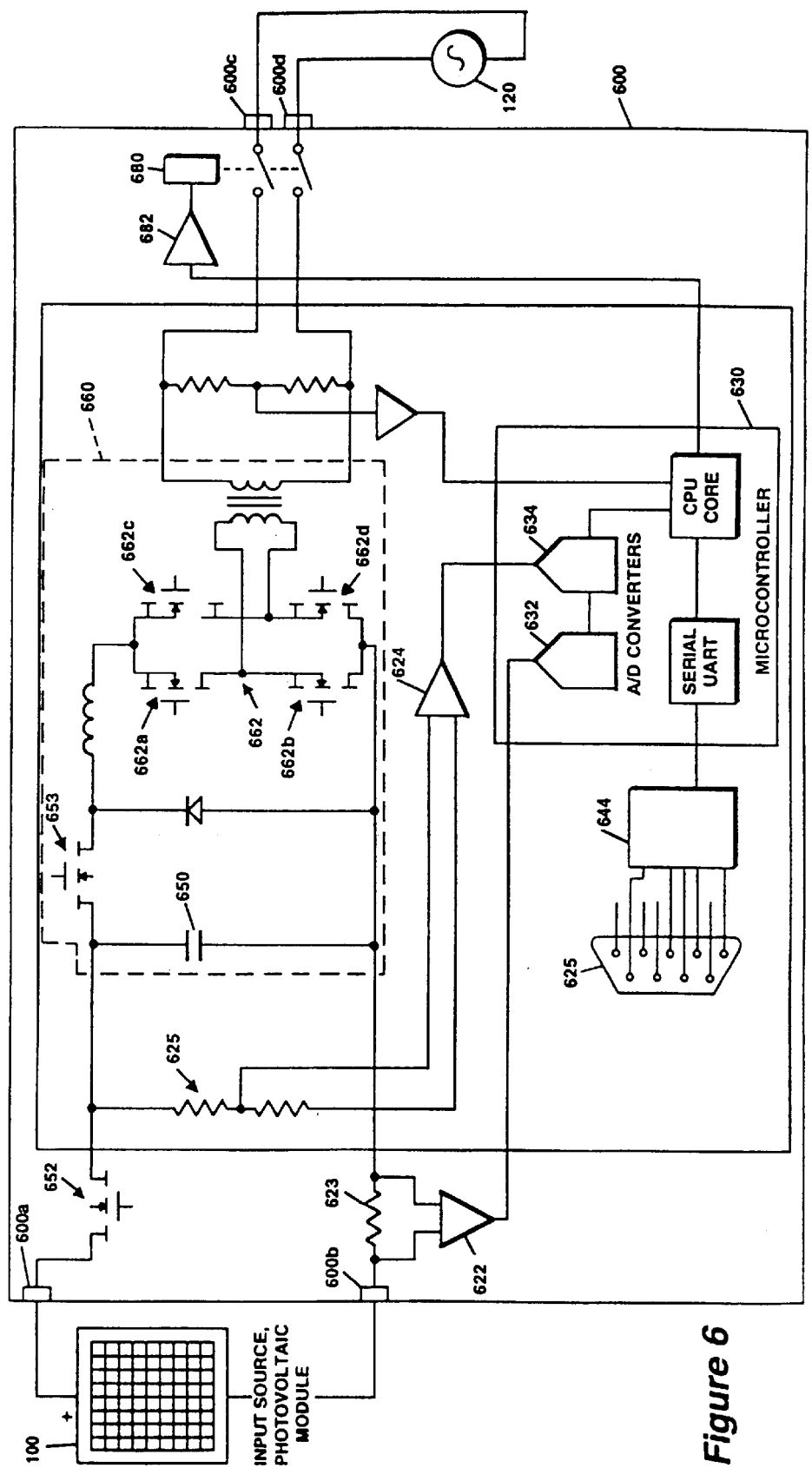
FIG. 6 is a diagram showing a current-voltage curve tracer according to the invention.

Referring now to FIG. 6, a preferred embodiment is implemented on a utility grid interactive inverter 600. A photovoltaic array 100 is connected to an input 600*a*, 600*b* of inverter 600 and an output 600*c*, 600*d* of the inverter 600 is connected to a utility grid 120. The inverter 600 includes a power conversion and inversion section 660 which converts a DC voltage provided at the input to an AC voltage at the output. The power conversion and inversion section 660 includes an inverter H-bridge 662 having a plurality of MOSFETs 662*a*, 662*b*, 662*c* and 662*d* which operate in a known manner. A voltage divider network 625 is connected across the input of the power conversion and inversion section 660 and a differential amplifier 624 is connected across one of the resistors of the voltage divider network 625 to measure the input voltage with the output of the differential amplifier 624 being fed to an A/D converter 634. The A/D converter 634 provides a digital signal, indicative of the input voltage, to the microcontroller 630. To measure the input current, a current shunt 623, such as the Empro, Inc. MLA-30-50, is connected in line with the negative input 600*b* and the input of the power conversion and inversion section 660 as shown. A differential amplifier 622 is connected across the input and the output of the current shunt 623 as shown with the output of the differential amplifier 622 being fed to an A/D converter 632. The A/D converter 632 provides a digital signal indicative of the input current to the microcontroller 630. A switch 652, here implemented using a MOSFET, is connected in series with the input 600*a* as shown. This allows the user to connect and disconnect the PV array 100 from the power conversion and inversion section 660 and energy storage capacitors 650. It should be appreciated, however, that any switching device capable of fast switching times under electronic control and which is low cost might be used. A switch 653, here also implemented using a MOSFET, is connected between one of the inputs to the capacitors 650 and an input of the inverter H-bridge, 662. This switch is unique to the preferred embodiment in that it is part of a buck wave shaper used in the power conversion part of the inverter. It is shown because its state impacts the behavior of the invention. A relay driver 682 under the control of microcontroller 630 opens and closes switch 680 to isolate and connect, as needed, the outputs 600*c*, 600*d* of the inverter 600 to the utility grid 120. The inverter output switch 680 is there to prevent the utility grid 120 from backfeeding and preventing the capacitors from discharging. Though not harmful to the inverter, this would prevent the curve tracer from operating properly. The capacitors 650 shown are standard in the inverter 600 and would be part of any sine wave inverter with or without the IV curve trace capability.

Operation is as follows. Both the input switch 652 and output switches 680 are opened. In the preferred embodiment, an arrangement is used such that the capacitors 650 can be discharged by using the transistor switch 653 and MOSFETs 662*a*, 662*b*, 662*c* and 662*d* in the conduction mode. These are an inherent part of the power conversion and inversion section 660 of some types of inverters, including the preferred embodiment. They eliminate the need of a separate bleeder resistor or other special switch such as 654 in FIG. 6*a*. Once the voltage across the capacitors 650 is suitably close to zero, switch 653 is opened. The DC input switch 652 is closed and the capacitors 650 begin charging. Voltage and current measurements are taken and stored on-board the microcontroller as the capacitors 650 charge to provide a plurality of data points to plot the IV curve. As the capacitor voltage nears the open circuit voltage, Voc, of the PV array, current decreases substantially and the rate of change of the voltage slows appreciably, as shown in FIG. 4a. This is an asymptotic charge curve and in fact will never reach Voc. However it will get sufficiently close to permit a very accurate IV curve trace to be generated. In order to improve the trace it is desirable to locate Voc. This is done by opening switch 652. This removes the capacitor 650 from the circuit. With the capacitor 650 removed the input impedance goes to the off resistance of the MOSFET which is, for the purposes of this discussion, infinity. When the array looks into infinite input impedance the array voltage goes to Voc. This can be measured using differential amplifier 624, voltage divider 625, and A/D 634 as described above. Measurement of Voc requires the arrangement shown in FIG. 6b where the voltage divider 625 is on the array side of switch 652. In the preferred embodiment, the entire data set is then downloaded to the host computer for storage, processing and plotting.

Figure 6A:
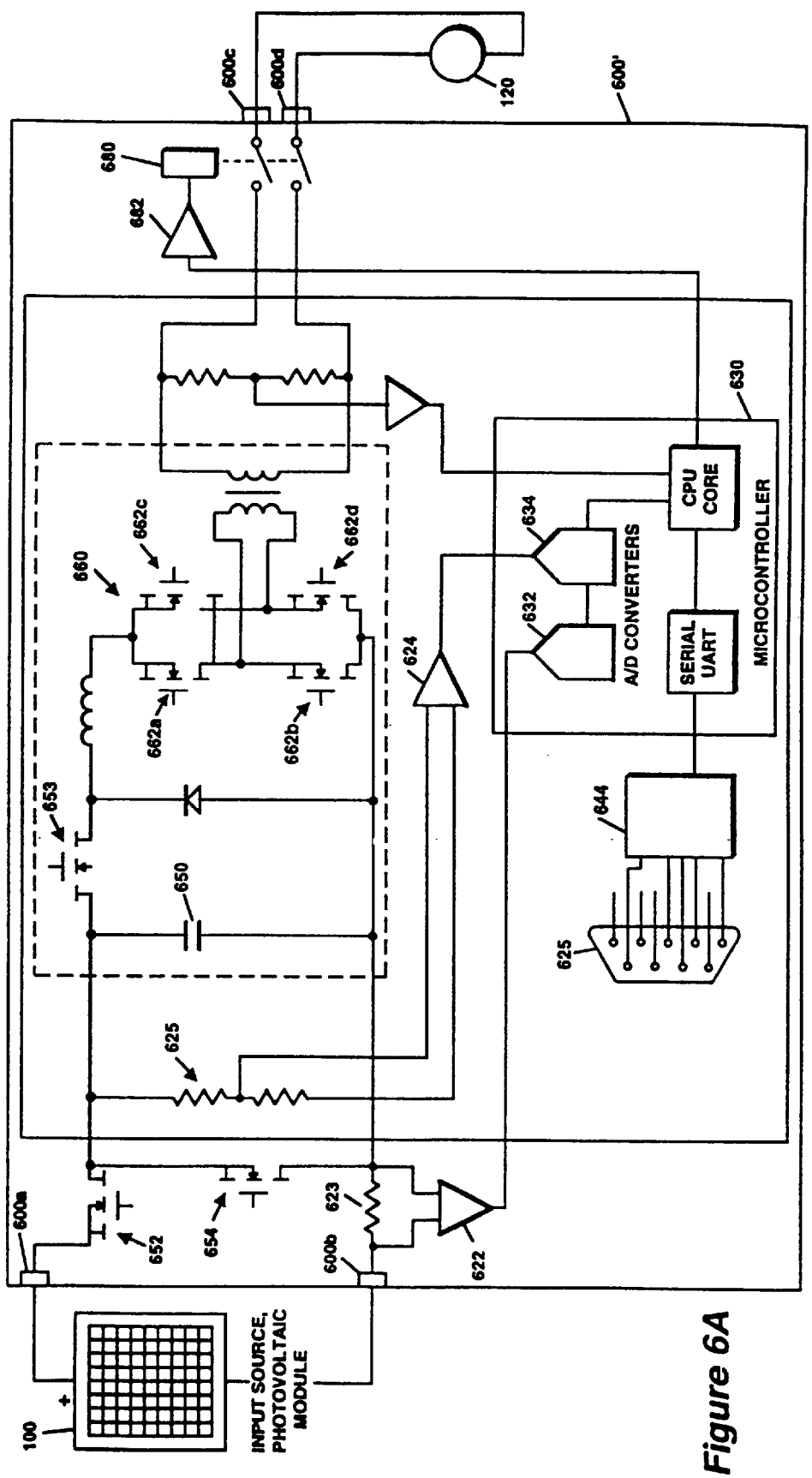
FIG. 6A is a diagram showing an alternate embodiment of a current-voltage curve tracer according to the invention.

Referring now to FIG. 6A, an inverter 600' is shown of an alternative embodiment of the inverter 600 of FIG. 6. A switch 654, here implemented using a MOSFET, is connected across inputs of capacitors 650 as shown. The switch 654 when closed is used to discharge the capacitors 650 instead of utilizing switch 653 and the inverter bridge 662. The switch 654 is used in instances when the characteristics of the power conversion and inversion section 660 do not lend themselves to properly discharging the capacitors 650.

Figure 6B:
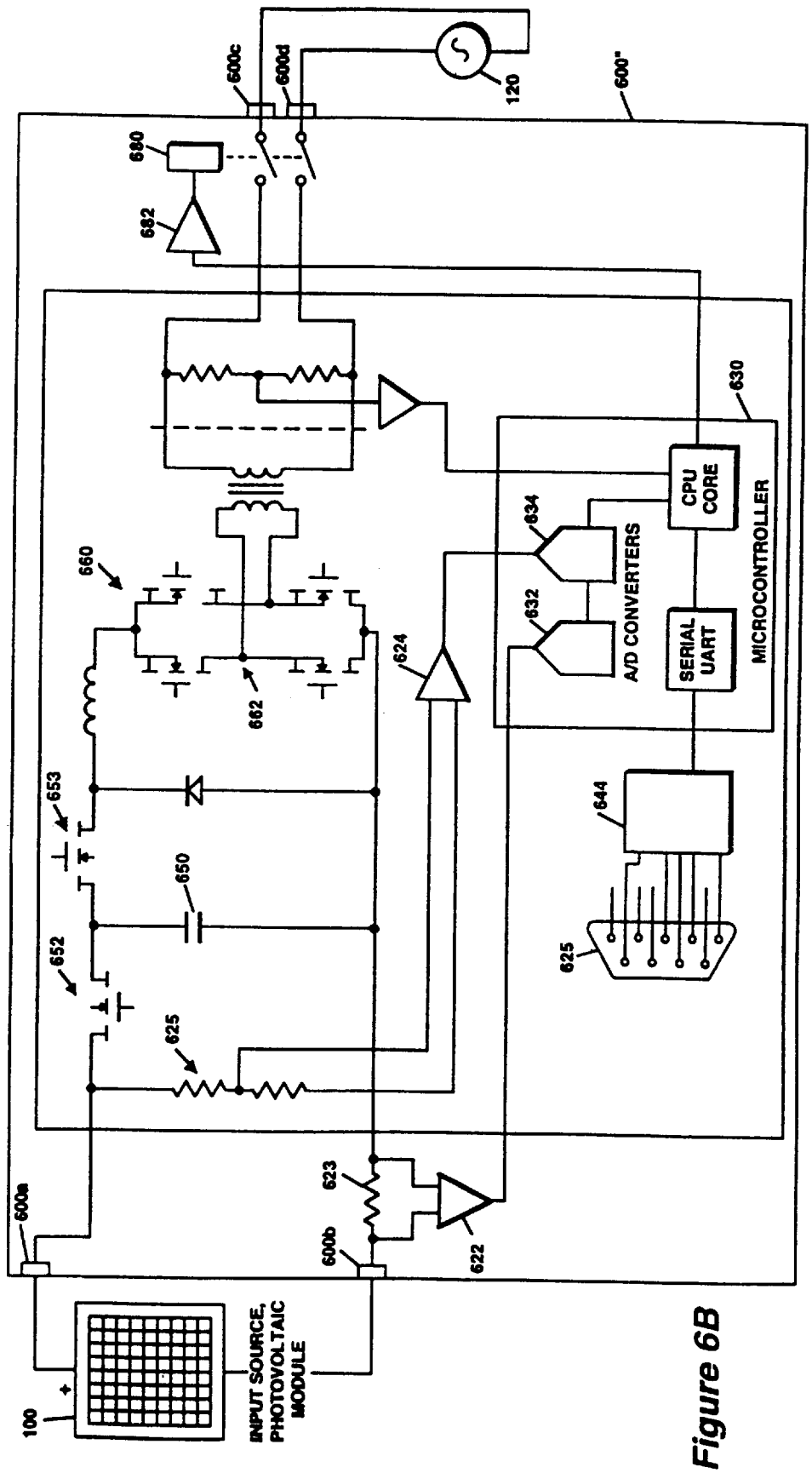
FIG. 6B is a diagram showing still another alternate embodiment of a current-voltage curve tracer according to the invention.

Referring now to FIG. 6B, an inverter 600" is shown of still another alternative embodiment of the inverter 600 of FIG. 6. Here, the switch 652, is connected between the voltage sensing circuit and the capacitors 650 as shown. The switch 652 when closed is used to charge the capacitors 650 as described above. When the switch 652 is open, the open circuit voltage of the PV array can be measured.

It should now be appreciated that with the above described arrangement, an inverter is provided with a first switch to disconnect an output of the inverter from any device connected thereto; a second switch to disconnect and connect an input of the inverter from direct current fed to the inverter by a PV array; a discharge device to discharge any residual charge on a large capacitor; a voltage sensor to measure input DC voltage to the inverter; a current sensor to measure input DC current to the inverter; and a data recorder to provide present current-voltage curve data. With such an arrangement, the host computer, 160 (FIG. 2a) can compare up-to-date measurements with prior measurements to discover solar array degradation from shading and other causes.

The maximum power point can easily be extracted from the IV curve. The following algorithm works very quickly with high speed computers available today. Analyze the data points as follows: Start at the data point that is half of Voc and its corresponding current point. Multiply the two together to get power. Increment to the next voltage point and do the same. If the power is larger increment to the next higher voltage. Continue until a point is reached where the power is lower than that for the previous data pair. The higher of the two represents the voltage at which the maximum power point exists. The accuracy can be increased in the following way. Take the point before the one where the MPP was found and generate a line between it and the MPP call it A. Now take the point after the MPP and the point that follows it and generate a line, call it B. The intersection of A and B will be a better approximation of the MPP. Similar methods using curve fitting techniques could also be used to further enhance accuracy though it is not clear that going to that extreme would be useful.

Using the MPP found above, the inverter's Maximum Power Point tracking system can be evaluated. In order to do this it must first be ascertained that it is not a cloudy day. On a clear day, the MPP stays roughly constant over a time period of several minutes. One way to ascertain that there are no clouds causing insolation fluctuations is to take the standard deviation of the MPP measured over a small time period of roughly 5 minutes. Experimentation will determine what the appropriate thresholds are. Below that threshold and when it is a clear day, calibration will be performed as follows. Allow the inverter to operate in its normal mode. Record MPP in 5 second intervals for 5 minutes. Perform an IV curve trace. Set the inverter at the MPP found in the IV curve trace and reactivate the MPP tracker with the inverter operating. Record MPP in 5 second intervals for 5 minutes. Now take the standard deviation of the two MPP data sets. If it is below the threshold then conditions are constant. From those two data sets, take the average and that is the operating MPP. Now compare that to the MPP found using the IV curve tracer. The difference between these two points shows how far off the MPPT is. One skilled in the art can take this data and develop calibration routines.

Having described preferred embodiments of an inverter with integrated instrumentation, it should be appreciated that there are a number of alternate methods for measuring voltage and current. For example to measure current, AC or DC, the preferred embodiment measures the voltage across a shunt resistor. Usually this is a fairly low voltage so a differential amplifier is used to boost the signal. An A/D converter is then used to convert to a digital signal. This value is then multiplied by a calibration constant in order to get the information in the proper units. Components which could be used include Empro HA-20-50 current shunt with an AD 621 instrumentation amplifier to boost the signal. In the preferred embodiment, the A/D converters on-board the microcontroller are used. However, if customers requested higher accuracy an AD7812 A/D converter could be used to digitize the signal. The latter is a 10-bit A/D converter.

An alternative embodiment is to use a Hall effect current sensor with an A/D converter. Hall effect sensors with appropriate sense and amplification circuitry can be purchased from manufacturers such as LEM and FW Bell. These have sufficient output signals to allow direct sampling by an A/D converter. The LEM LTS-25-NP is an example of this type of current sensor. Depending on the accuracy needed any number of different A/D converters can be used. Examples include the 8-bit converters on-board a PIC 16C74 microcontroller or, alternatively, the AD 7812 10 bit external A/D converter.

For AC signals, a current transformer such as the Coilcraft CS60-050 can be used with an AD 621 differential amplifier or OP177 precision op-amp to amplify the signal for digitization. A/D converters as mentioned above can then be used to digitize the signal. In the case of AC sinewave currents it is important that the peak voltage be measured. Thus, a zero crossing detector is often used to ascertain the timing of the signal and the sample then taken at the appropriate time. Alternatively the LEM LTS-25-NP could be used. Also, a current shunt on the array side of the inverter bridge could be used with a differential amplifier amplifying the signal and sending it to an A/D converter.

To measure voltage, AC or DC, a resistive voltage divider is typically used. To meet UL listing requirements a single component failure cannot expose circuitry to voltages or currents that could cause a fire. To address this, the voltage divider can be constructed from three resistors rather than two. The designer can use two resistors to form the top resistor value in the divider. If these are chosen properly a single component failure will not allow current to flow sufficient to start a fire. The voltage divider is constructed in this manner and then sensed on the low voltage side with a standard op-amp. The amplified signal is then fed into an A/D converter as described above. Common resistors are chosen as needed for configuration. Typically an instrumentation amplifier is used to address common mode noise problems. An AD 621 is suitable in this application.

An alternative technique includes using voltage to current conversion followed by Hall effect transducer. A method used to produce a well isolated voltage transducer is to drop the voltage across a resistor, sense the current with a Hall effect transducer and sense the Hall effect transducer output with an A/D converter. Examples of hardware used to produce this implementation are LEM LV 100–300 voltage transducer and A/D converters mentioned above. This invention should not be restricted to its disclosed embodiment, but rather should be limited only by the spirit and scope of the appended claims.

What is claimed is:

1. A method of operating an inverter for converting direct current (DC) to alternating current (AC) comprising:
   (a) measuring input DC voltage to the inverter;
   (b) measuring input DC current to the inverter;
   (c) measuring output AC voltage from the inverter;
   (d) measuring output AC current; and
   (e) determining solar insolation.

2. The method of claim 1 further comprising:
   (a) operating the inverter at a maximum power point;
   (b) calculating, from the input DC voltage and the input DC current, input power to the inverter; and
   (c) calculating, from the input power to the inverter, a solar insolation value.

3. The method of claim 2 further comprising:
   (a) calculating output power from the inverter; and
   (b) calculating operating efficiency of the inverter.

4. The method of claim 1 further comprising calculating harmonic distortion of an output signal of the inverter.

5. The method of claim 1 further comprising:
   (a) determining the maximum power point of the inverter;
   (b) determining the temperature of a solar cell; and
   (c) calculating solar insolation.

6. The method of claim 1 further comprising:
   (a) storing a plurality of maximum power point data for a plurality of respective current-voltage curves;
   (b) determining temperature of the solar cell to provide temperature data; and
   (c) determining a solar insolation value from the determined temperature data and a selected one of the plurality of maximum power point data.

7. The method of claim 1 further comprising:
   (a) storing a plurality of maximum power point data for a plurality of respective current-voltage curves;
   (b) determining insolation with a sensor; and
   (c) obtaining a cell temperature from the insolation and a selected one of the plurality of maximum power point data.

8. The method of claim 1 further comprising:
   (a) measuring wind speed about a photovoltaic power system to which the inverter is coupled;
   (b) measuring ambient temperature about the photovoltaic power system; and
   (c) measuring module temperature of the inverter.

9. A method for measuring parameters of a photovoltaic array by operating an inverter having an input and an output, the method comprising:
   (a) disconnecting the output of the inverter from any device connected thereto;
   (b) disconnecting the input of the inverter from a direct current fed to the inverter;
   (c) discharging residual charge on a capacitor;
   (d) connecting the input of the direct current across a capacitor;
   (e) measuring input DC voltage to the inverter;
   (f) measuring input DC current to the inverter; and providing current voltage data indicative of the parameters of the photovoltaic array.

10. The method of claim 9 further comprising:
    (a) repeating the steps of:
        (i) disconnecting an output of the inverter from any device connected thereto;
        (ii) disconnecting an input of the direct current fed to the inverter;
        (iii) discharging any residual charge on a large fully discharged capacitor;
        (iv) connecting the input of the direct current across a large fully discharged capacitor;
        (v) measuring input DC voltage to the inverter;
        (vi) measuring input DC current to the inverter; and
        (vii) calculating a current voltage trace to provide a current-voltage curve tracer; and
    (b) comparing current measurements with prior measurements to deduce solar array degradation.

11. The method of claim 9 further comprising:
    (a) repeating the steps of:
        (i) disconnecting an output of the inverter from any device connected thereto;
        (ii) disconnecting an input of the direct current fed to the inverter;
        (iii) discharging any residual charge on a capacitor;
        (iv) connecting the input of the direct current across a capacitor;
        (v) measuring input DC voltage to the inverter;
        (vi) measuring input DC current to the inverter; and
        (vii) providing a current voltage trace to provide a current-voltage curve tracer; and
    (b) comparing current measurements with known measurements to ensure proper insolation measurements.

12. The method of claim 9 further comprising:
    (a) repeating the steps of:
        (i) disconnecting an output of the inverter from any device connected thereto;
        (ii) disconnecting an input of the direct current fed to the inverter;
        (iii) discharging any residual charge on a capacitor;
        (iv) connecting the input of the direct current across a capacitor;
        (v) measuring input DC voltage to the inverter;
        (vi) measuring input DC current to the inverter; and
        (vii) providing a current voltage trace to provide a current-voltage curve tracer; and
    (b) comparing current measurements with known measurements and calibrating a maximum power point tracker using current measurements.

13. An inverter comprising:
    (a) a first switch coupled between an output of the inverter and a device connected to the output of the inverter, said first switch;

(b) a second switch for disconnecting an input of the direct current fed to the inverter;

(c) a discharge circuit coupled to a capacitor;

(d) means for connecting the input of the direct current across the large fully discharged capacitor;

(e) a voltage sensor coupled to the input of the inverter, said voltage sensor for measuring input DC voltage to the inverter; and (f) a current sensor coupled to the input of said inverter, said current sensor for measuring input DC current to the inverter.

14. The inverter as recited in claim 13 further comprising means for providing a current voltage trace to provide a current-voltage curve tracer.

15. The inverter as recited in claim 13 further comprising:

(a) means for comparing current measurements with known measurements to ensure proper insolation measurements.

16. The inverter of claim 13 further comprising a comparator for comparing current measurements with known measurements and calibrating a maximum power point tracker using up to date measurements.

17. The method of claim 1, wherein the inverter is coupled to a PV module and the method further comprises measuring temperature of the PV module.

\* \* \* \* \*